Nov. 17, 1931.   B. HALL ET AL   1,832,382
VARIABLE SPEED TRANSMISSION MECHANISM
Original Filed Sept. 11, 1922   4 Sheets-Sheet 3
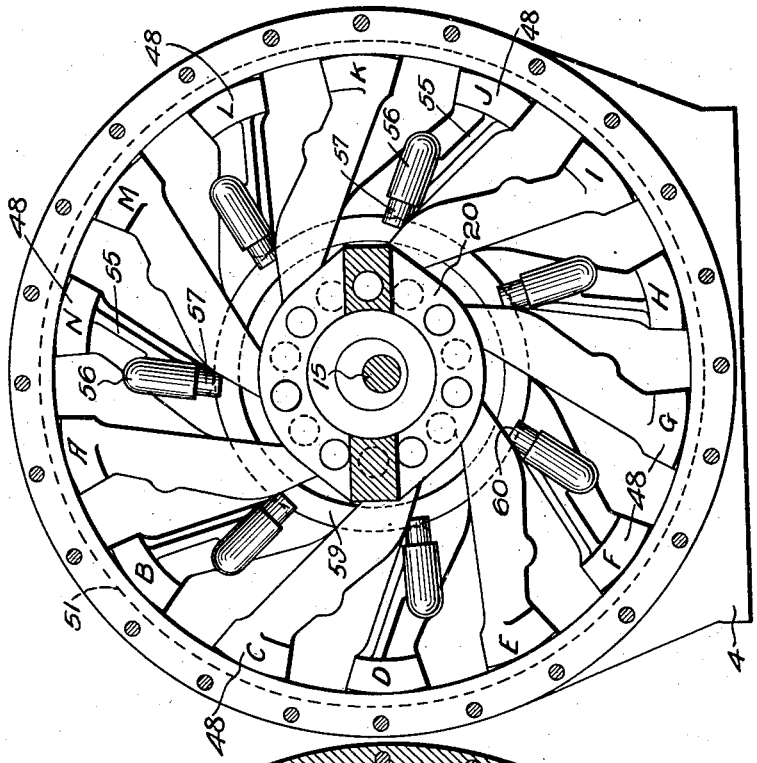
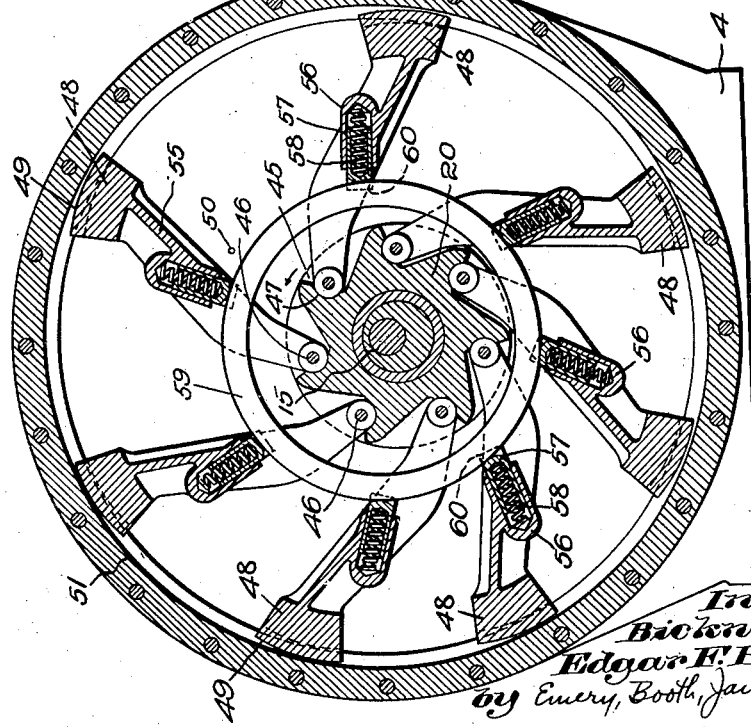

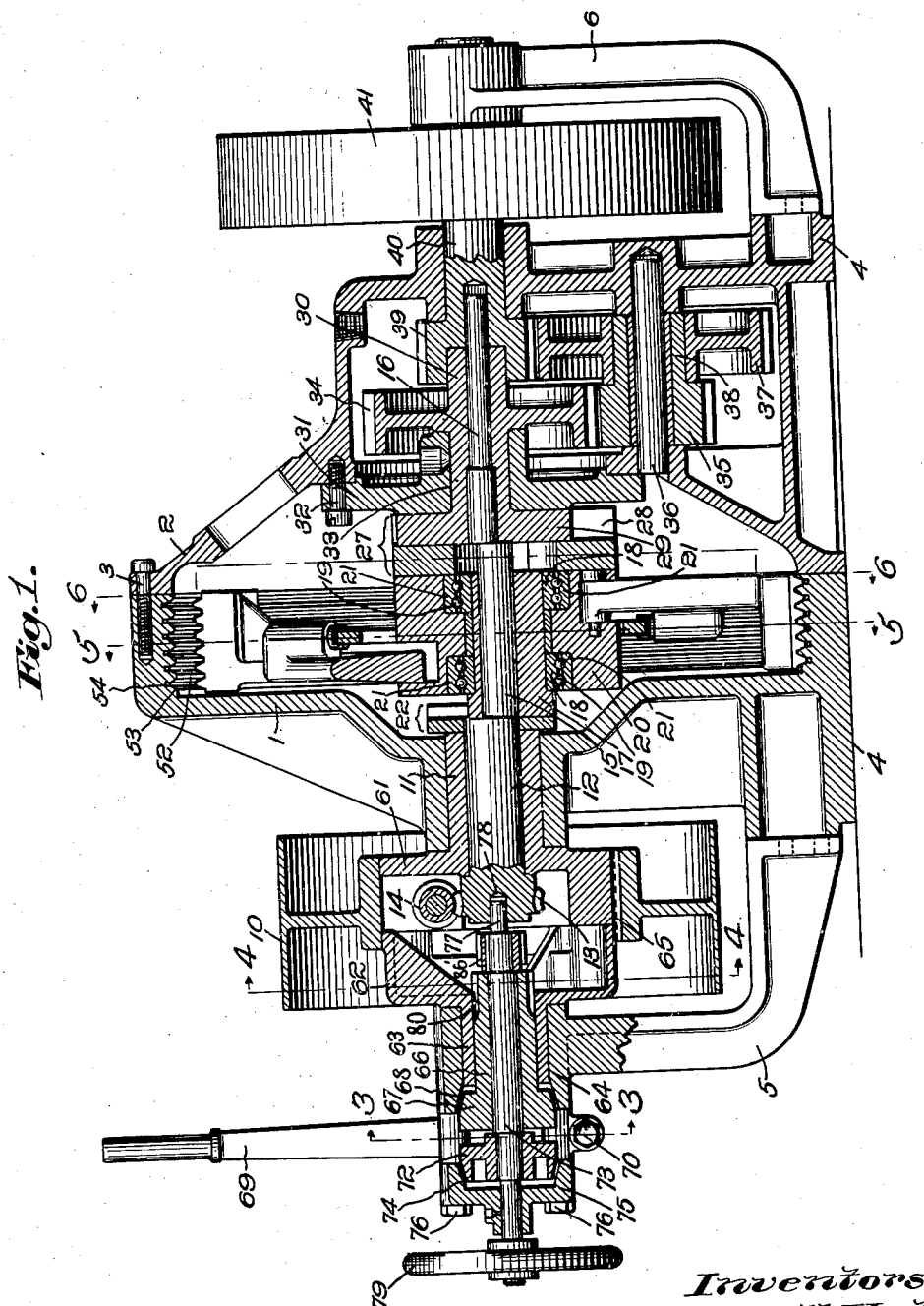

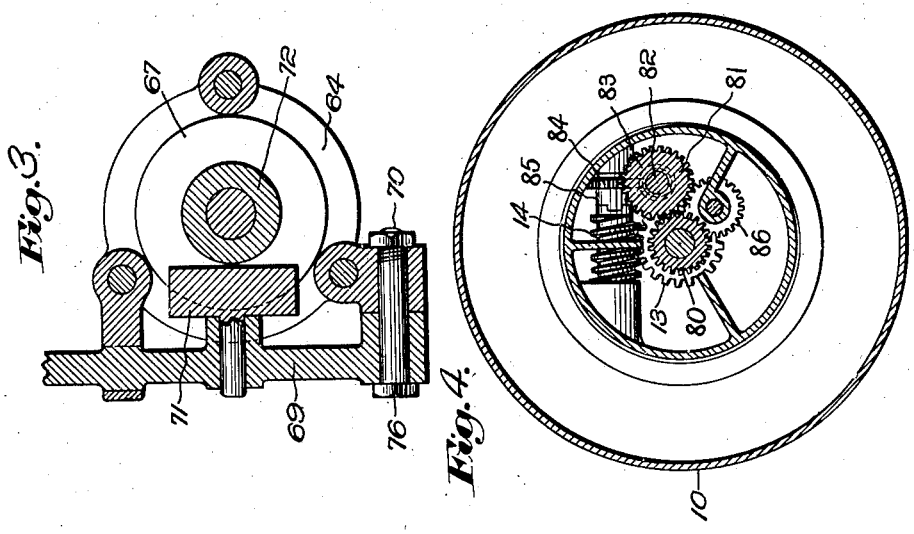
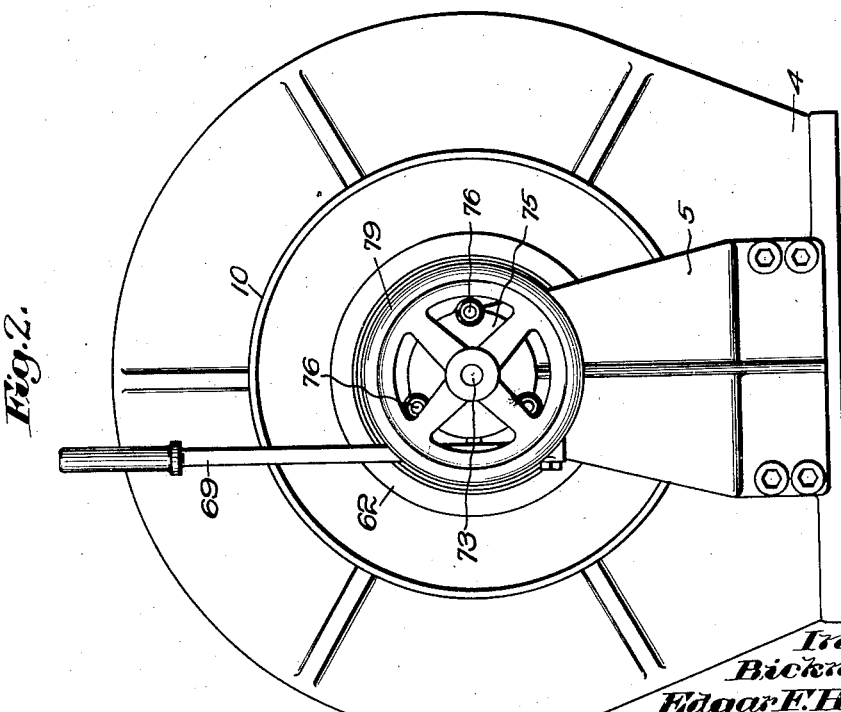

Nov. 17, 1931.  B. HALL ET AL  1,832,382
VARIABLE SPEED TRANSMISSION MECHANISM
Original Filed Sept. 11, 1922  4 Sheets-Sheet 4

Inventors:
Bicknell Hall,
Edgar F. Hathaway,
by Emery, Booth, Janney & Varney
Attys.

Patented Nov. 17, 1931

1,832,382

UNITED STATES PATENT OFFICE

BICKNELL HALL, OF ABINGTON, AND EDGAR F. HATHAWAY, OF WELLESLEY, MASSACHUSETTS, ASSIGNORS TO HALL COMPANY, OF BOSTON, MASSACHUSETTS, A CORPORATION OF MASSACHUSETTS

VARIABLE SPEED TRANSMISSION MECHANISM

Application filed September 11, 1922, Serial No. 587,280. Renewed November 6, 1930.

This invention relates to variable speed transmission mechanisms and is an improvement upon the mechanisms disclosed in certain co-pending applications of Bicknell Hall, and particularly is it an improvement upon the mechanism disclosed in the co-pending application of the said Bicknell Hall Serial No. 194,012, filed September 29, 1917, as a refiling of his then co-pending application Serial No. 157,248, renewed March 24, 1917, and originally filed February 23, 1911, as application Serial No. 610,295.

In order that the principle of the invention may be readily understood, we have disclosed in the accompanying drawings, one embodiment thereof selected for illustrative purposes. In said drawings,—

Fig. 1 is a vertical longitudinal sectional view taken through the transmission mechanism, the driven pulley and a portion of its support being shown in elevation;

Fig. 2 is an end elevation of the transmission mechanism viewed from the left in Fig. 1;

Fig. 3 is a vertical transverse section upon the line 3—3 of Fig. 1;

Fig. 4 is a vertical transverse section upon the line 4—4 of Fig. 1;

Fig. 5 is a vertical transverse section upon the line 5—5 of Fig. 1;

Fig. 6 is a vertical transverse section upon the line 6—6 of Fig. 1, but showing the parts concentrically positioned and hence in a non-driving relation;

Figure 10:
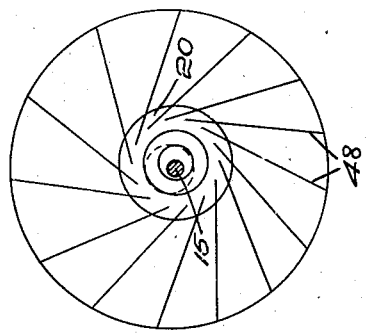
Figs. 9 to 12 inclusive are diagrams illustrating the operation of the mechanism.
Figure 12:
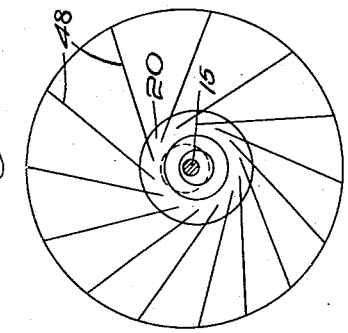
Figure 9:
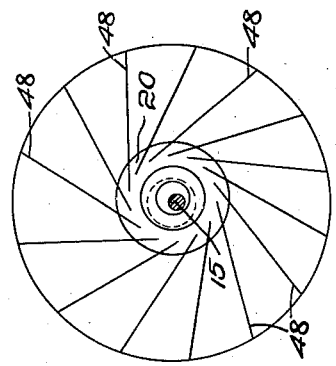
Figure 11:
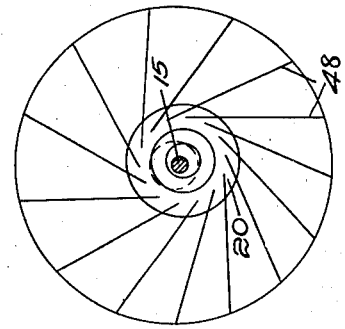

Referring first to Figs. 1 to 8 inclusive, there is provided a suitable casing having a shell like member 1 of generally cylindrical form and a member 2 of generally conical form secured thereto by screws 3, said members having flattened bases 4 upon which the entire mechanism rests. The members 1, 2, constitute a casing within which are received the moving parts of the mechanism, and also suitable lubricant, such as heavy oil or grease, in which the parts hereinafter described move. Formed with or secured to the lower portion of the member 1 is an upstanding arm or bracket 5 and formed with or secured to the lower portion of the member 2 is a similar arm or bracket 6, the parts to be hereinafter described being in part supported by said arms or members 5, 6.

Power may be applied to the transmission mechanism in any suitable manner as by a belt received by the pulley 10, Fig. 1. The said pulley 10 is carried by the main driving shaft 11, which is tubular. Preferably carried within the pulley 10 are certain gears or gearing members to be hereinafter more fully described, for varying the eccentricity of an eccentric mounted upon a shaft 12 itself mounted within the main drive shaft 11, and means are provided controlling the action of said gears for the purpose of changing the speed derived from the transmission mechanism. Any suitable means may be employed for moving the shaft 12 for the purpose stated. We have, herein illustrated a power shifting mechanism and the same will be hereinafter referred to in sufficient detail to permit the operation of the transmission mechanism to be clearly understood.

The shaft 12 has formed upon one end thereof a worm wheel 13 adapted to be driven by a worm 14 within the pulley 10 and constituting a portion of the train of gearing of the power shifting mechanism hereinbefore referred to. The said shaft 12 is provided with a concentric portion directly supported within the main drive shaft 11 and with an eccentric portion 15 shown in Fig. 1 and a succeeding concentric portion 16. Surrounding the eccentric portion 15 of the shaft 12 is an eccentric 17 carrying ball bearings 18, 19, 21, whereon is received the ring or gyrator 20. The purpose of the partial rotation of the shaft 12 by means of the worm and worm wheel 13, 14, is to vary the eccentricity of the eccentric 17 and hence to vary the orbital movement of the ring or gyrator 20 which may be so positioned as to be concentric with the main drive shaft 11 or to be eccentric thereto to the extent desired. If the ring 20 be positioned concentrically with respect to the main drive shaft 11, the parts carried by said ring 20 remain quiescent and do not function to drive the driven element, but said parts begin to function as a position of eccentricity is imposed upon the ring 20, and the resulting speed is increased as the condition of eccentricity is increased.

In order to convey movement from the main drive shaft 11 to the eccentric 17, any suitable means may be provided. Herein for the purpose we have provided a unison ring indicated at 22 in Fig. 1, and shown in perspective in Fig. 8. The said ring is provided with two diametrical grooves 23, 24 in the opposite faces thereof and arranged at right angles to each other. The groove 23 receives a transverse tongue or rib 25 upon the end of the main drive shaft 11 and the groove 24 receives a similar tongue or rib 26 upon the eccentric 17, the construction being such that the unison ring will adjust itself to the position of the eccentric 17 whether the latter be concentric with the driving shaft 11 or whether it be eccentric thereto more or less, and will drive the eccentric in any position of the latter.

Figure 7:
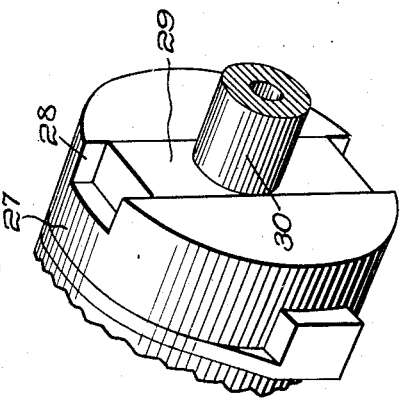
Fig. 7 is a perspective view of one of the unison rings of the transmission mechanism.
Figure 8:
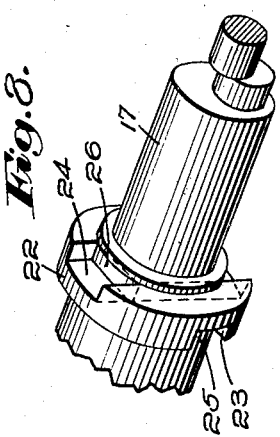
Fig. 8 is a perspective view showing another unison ring and a part of the shaft having eccentric portions.

At the side of the eccentric 17 opposite the unison ring 22 there is provided another unison ring 27, shown also in Fig. 7, and similar to that just described in that it is provided at the opposite faces with diametrical grooves arranged at right angles to each other and receiving ribs or tongues at its said opposite faces, the groove at the right hand face, viewing said figures, being indicated at 28. Received in said groove 28 is a tongue 29 formed integrally with which is a sleeve 30 supported within an upright plate 31 secured by screws 32 to the inner face of the conical member 2, and constituting a bearing for said sleeve 30 as indicated at 33. Formed integrally with or rigidly secured to the sleeve 30 is a gear 34 which meshes with a pinion 35 supported upon at stud shaft 36 itself mounted at both ends in the casing member 2. The pinion 35 constitutes a member of a train of gearing for driving the ultimately driven member at a higher rate of speed. The other members of said train of gearing herein consist of a gear 37 keyed upon the hub 38 of the pinion 35 and meshing with a pinion 39 loose upon the sleeve 30 but having a sleeve 40 upon which is fast the pulley 41 constituting the final or ultimate driven element from which power is taken.

The ring or gyrator 20, as most clearly shown in Figs. 5 and 6, is provided with a series of driving arms, pushers or abutment engaging members, the number of which may be widely varied within the scope and purpose of our invention but which in the present instance is fourteen. The said driving arms, pushers or members are indicated at A to N inclusive. Desirably but not necessarily the said arms are arranged in two groups side by side for compactness and simplicity, and for effectiveness of operation. In order to support the arms we preferably provide the following construction to which our invention is not limited.

The circumference or periphery of the ring 20 is provided with a number of recesses 45 corresponding in number with the number of arms, pushers or members, seven of such recesses being shown in the sectional view, Fig. 5, and the other recesses alternating therewith in another but parallel plane, as will be understood. Each of said arms A to N inclusive is secured by a pivotal pin 46 in a curved socket 47 in one face of its recess 45.

The pivotal points of said arms, pushers or members are so relatively close to the axis of rotation that their angular position will be so nearly radial that each arm, pusher or member has an abutment-engaging or seating action with respect to the casing and with no appreciable tendency to slip circumferentially relative to said casing, as will more fully hereinafter appear.

The said arms are desirably of the form shown and as most clearly indicated in Fig. 5, they are each mounted a slight distance away from the axis of the main driving shaft 11, but relatively close thereto, and so that their line of driving thrust is but slightly removed from a radial line drawn from the center of the main driving shaft to the point of driving contact of the arms with the inner surface of casing 1. Said arms occupy an approximately or nearly approximately radial position, by which we mean only such departure from a truly radial position as will preserve the abutment action or function as controlling, contradistinguished from a slipping action. The resolution of forces may be stated to be such that the seating or abutment function predominates rather than the function of sidewise movement, which would predominate if the angular position were greater.

If said arms were truly radially positioned with respect to the casing, no driving action could occur, although they may be radially positioned with respect to the ring or gyrator 20 and effectively drive, and if said arms were so positioned that no seating, abutment or pushing action occurred the mechanism would be ineffective for the purpose of securing uniform motion at any speed.

Each of said arms is here provided with a head 48 of segmental form, but the outer surface 49 thereof is not formed as an arc struck from the center of the main drive shaft. In this embodiment of the invention said surface 49 is struck from the point of intersection of a circle having a radius substantially less than that of the casing and concentric with the center of the main drive shaft and a line drawn from said center of main rotation to the inner surface 51 of the casing 1 at the point of driving contact of the head 48 therewith, one of such points being indicated at 50 in Fig. 5.

It will be noted that in our variable speed transmission mechanism as herein disclosed we avoid entirely the use of pawl and ratchet mechanism or the like for obtaining an effective drive. Were a pawl and ratchet mechanism employed, the angle between a line intersecting the engaging point of the pawl and the pawl fulcrum or point of pivotal support and a line intersecting the axis of main rotation and said engaging point of the pawl would assume little or no importance in the construction of the transmission mechanism provided it were not too great on the one hand to cause the pawls to interfere, or so little on the other hand as to impart a toggle crushing action. Pawl and ratchet mechanism is wholly unsuited to applicants' purpose, however, because of the necessarily resulting lack of universality, the resulting stepped speeds, and for other reasons, whatever may be the usefulness of pawl and ratchet devices in other mechanical fields.

An important aspect of our invention lies in the avoidance of the use not only of pawl and ratchet mechanism, but also of any friction gripping or clutch-like device at the end of the abutment driving arms or units, as contrasted particularly with a non-slip, direct pushing or thrusting construction such as herein disclosed. As herein disclosed each driving arm at its period of driving function is made to act as an abutment of strut with a thrust in the direction of its length and because the thrust is in the direction of the length of the arm with no gripping device at the end, said thrust must occur along a line but slightly removed from a direct radial line between the axis of general rotation and the point of contact at the end of the arm else the arm will slip. In an abutment driving mechanism such as herein disclosed, the angle between a line intersecting the point of abutting contact and the fulcrum or pivotal point of the abutment arm and a line between the same point of abutting contact and the axis of main rotation assumes great importance, and must not exceed approximately 20°. As herein indicated, said angle as defined by a radial line drawn from the center of the main drive shaft to the inner surface of the casing 51 at the point of effective driving contact of an arm therewith and a line drawn from the same point on said surface 51 to the pivot of the same driving arm is not greater than approximately 10° to 14° even in the position of minimum eccentricity of the parts when functioning to drive, and this relation maintains throughout the series of arms. Obviously, however, our invention is not restricted to the disclosed construction except within the limits above indicated.

Further, in the mechanism as herein disclosed employing a straight abutment or driving arm with no clutching device at the end, the relation between the distance from the point of engaging contact of the abutment arm to the fulcrum or pivotal point of said arm and the distance between the fulcrum or pivotal point of the abutment arm to the axis of main rotation becomes of vital import. The radial distance from the fulcrum of the abutment arm to the main axis of rotation must be relatively short as compared with the distance from the fulcrum of the abutment arm to the point of engaging contact thereof with the abutment casing. The distance last mentioned preferably should be at least three times as great as the first mentioned distance.

With the low angular position of the abutment arms as herein disclosed, if the radial distance from the fulcrum of the abutment arm to the point of outside contact were anything like equal to the distance between the same fulcrum point and the main axis of rotation, the resultant action would be that of a destructive toggle tending to break the apparatus apart instead of to drive. Such action can only be avoided by shortening the radial distance from the fulcrum or pivotal point of the abutment arm to the main axis of rotation to such an extent that it is at least about one to three of the distance from the fulcrum of the arm to the point of abutting contact with the casing 1, thereby producing an elbow-like action that will cause the fulcrum to be turned rotatively and to impart driving action instead of a toggle-like action which would destroy the parts.

The distance referred to above between the fulcrum or pivotal point of the abutment driving arm and the axis of main rotation may be termed the driving radius and the proportion may be otherwise stated as follows: The driving radius must be substantially equal to the tangent of the angle made by a line drawn through the center of the fulcrum of the driving arm and through the point of contact of said arm with the annular driving surface and the line drawn through said point of contact and the axis of main rotation.

At all times, whether the gyrator 20 be eccentric to the main drive shaft as shown in Fig. 5, or be concentric with respect thereto as shown in Fig. 6, the face or surface 49 of each head 48 is in contact with the inner surface 51 of the casing 1. The several arms A to N, however, act as driving members each in turn or in overlapping-driving relation and only at the point where a line drawn through the center of the main driving shaft and the point 50 for that arm intersects said surface 51. At all other times provided the gyrator 20 is eccentric to the main driving shaft, the surface 49 of each arm rolls or slides (first rolling and then sliding) along the inner surface 51 of the casing without driving effect. At all times, however, one or more of the arms A to N is driving and therefore the result is a constant motion of the gyrator 20 upon its own axis since instantly with the cessation of driving action of one or more of the arms, the arm or arms next in front begins to drive and the other arms, both before and behind, slide along until they in turn reach a driving position. The number of arms actually driving at any given instant of time depends in part upon the total number of the arms provided. In certain cases there may be what we herein term as overlapping driving action or concurrent driving action of a plurality of arms.

Assuming that the gyrator 20 is eccentrically positioned with respect to the main drive shaft 11, and that the main drive shaft is for example rotated in a contraclockwise direction viewing Fig. 5 (but as hereinafter pointed out the direction of rotation of the main drive shaft is immaterial), then the ring 20 is gyrated about the main drive shaft. Viewing Fig. 5, it will be noted that the broader part of the eccentric is below the centre of the main drive shaft and that said broader part is moving upward in a contraclockwise direction. At that instant, the arm, which is pivoted opposite, or substantially opposite, the said broader part of the eccentric is functioning as a driving member because its surface 49 at that point so encounters said inner surface 51 that a line from such point of contact to the pivotal point 46 of said arm temporarily acts as a strut or brace. The result is that the ring 20 cannot merely gyrate about the main driving shaft without rotation on its own axis, but must rotate upon its own axis in a contraclockwise direction, as indicated by the arrow thereon in Fig. 5. Such impulse of rotation from any one arm is a brief one but it is overlapped by another nearly coincident impulse of rotation from the next arm, and so on in overlapping succession, so long as the main drive shaft is rotated and a condition of eccentricity of the ring 20 is maintained. Therefore the resulting motion is a continuous uniform motion.

It matters not what is the direction of rotation of the main drive shaft or what is the direction of gyration of the ring 20. Whether said rotation of the main drive shaft and said gyration of the ring 20 is clockwise or contraclockwise, the ring or gyrator 20 is caused to rotate in a contraclockwise direction viewing Fig. 5, as demonstrated in actual operation. In the disclosed embodiment of the invention the direction of rotation of the ring or gyrator 20 is contraclockwise.

It is apparent that the arms may be variously shaped and mounted and that their functioning surfaces 49 may be variously shaped. Herein we have represented each head 48 as having a grooved surface 52 shown most clearly in Fig. 1, and said grooves engage corresponding grooves 53 in the inner surface of the casing 1. While a single groove may be employed, we have here represented a multiplicity of grooves, six being shown, in order to secure a better driving effect. The driving effect is not against the bases 54 of the grooves but against the lateral walls thereof as clearly indicated in Fig. 1.

It is desirable that means be provided to hold each arm in contact with the inner surface 51 at all times. For this purpose we preferably provide spring means and desirably spring means of the character shown in Figures 5 and 6. In the construction referred to, each arm A to N is provided with a web or rib 55 having rigid therewith or formed integrally therewith a socket or pocket 56 desirably of generally cylindrical form and receiving therein a similarly shaped member 57 having a sliding motion with respect to the socket 56. Within the member 57 is positioned a spiral spring 58 under compression, the tendency of said spring being to move the member 57 inward against a floating pressure equalizer ring 59 supported wholly by the series of members 57. For that purpose each member 57 is bifurcated at its inner end as indicated in dotted lines at 60 in Fig. 5 and in full lines in Fig. 6, the said floating ring 59 being received between the said bifurcations of the several members 57. While other spring means may be employed for the purpose, the means shown has been found exceedingly efficient, as but a relatively short movement of each spring is necessary throughout the entire extent of movement of the arm pertaining thereto.

Each of the arms A to N in turn but in desirably overlapping relation, acts as a driving member and each in turn, but in overlapping cooperation with one or more other arms, acts as means for changing the gyration of the ring 20 into a combined gyration thereof and a rotation of said ring 20 upon its own axis. Inasmuch, however, as the action of each arm is instantaneously supplemented, in desirably overlapping relation, by the action of the next arm, there is in reality no moment of time when the gyration of the ring 20 is not occurring or when the enforced rotation of said ring is not occurring because of such overlapping relations—provided of course that the ring or gyrator 20 occupies an eccentric position with respect to the center or axis of the main driving shaft 11, and not a concentric position with respect thereto, as in the latter case the rotation of the main drive shaft would not result in any movement whatever of the arms, they then remaining wholly quiescent.

It will be understood from the foregoing that we have provided a drive shaft and a stationary element concentric therewith, herein embodied in the wall 51 of the casing 1. We have also provided a gyrator herein embodied in the ring 20. We have also provided means herein embodied in the arms A to N inclusive, which cooperate with both the stationary element and the gyrator, whereby said ring or gyrator is forced to rotate at a uniform rate about its own axis when caused to gyrate. Moreover, said ring or gyrator is forced to rotate about its own axis in a predetermined direction regardless of the direction of gyration. We have already pointed out that the main drive shaft 11 may be rotated in either direction, and the direction of drive of the driven element will be in the same direction, that is, in one direction only, namely, a contraclockwise direction, viewing Fig. 5, with the arms A to N mounted as shown. The same effect would be accomplished provided the main drive shaft were oscillated; in such case the member 20 would be constantly rotated in the same direction.

In Figs. 9 to 12 inclusive we have diagrammatically indicated the positions of the series of driving arms at various gyratory positions of the gyrator or ring 20.

The series of arms, driving members or pushers A to N are each operatively connected at one of its ends with the ring or gyratory member 20 and is, when functioning, positively supported at its opposite end so as to cause said arms, driving members or pushers to impart rotary movement to the said gyratory member or element 20 simultaneously with and consequent upon gyratory motion thereof. In the disclosed embodment of the invention, each member of the circumferential series of arms, driving members or pushers is operatively connected at one of its ends with the said gyratory member or ring 20 and has periodic positive functioning support at its opposite end to cause it intermittently to impart rotary motion to said gyratory member or ring 20 simultaneously with and consequent upon gyratory motion thereof.

The term "positive" as herein employed includes and means anything that has such direct contact of the pusher arm or driving member with its support that there would be no slipping tendency that would have to be resisted by a friction grip of some sort.

In the disclosed embodiment of the invention each arm or driving member acts periodically as a strut or as an abutment whereby to effect rotatory movement of the gyratory member simultaneously with and consequent upon the gyratory motion of said member.

The angular position of the driving arms or abutment-engaging members A to N taken with the formation of the abutting surfaces of said arms of the casing abutment, or taken with the material of the said abutting surfaces, is such that even in the presence of lubrication there can be no circumferential slipping of the ends of the said arms or members. Any one or more of said factors including the angular position of the said arms or members may cooperate to effect the proper driving action, resulting in the uniform rotation of the ring or gyrator.

Any suitable means may be provided to change the degree of eccentricity of the ring or gyratory member 20 or to place the same in a concentric position with respect to the main drive shaft.

We herein provide the main drive shaft 11 with an enlarged part or radial flange 61 at one end and secure the same in suitably spaced relation to the enlarged generally cylindrical part 62 of a sleeve or hollow shaft 63 which itself is supported for rotation in the bearing 64 at the upper end of the member 5 as shown most clearly in Fig. 1. Keyed at 65 upon the enlargement or flange 61 is the driving pulley 10. Cylindrically positioned within the sleeve or hollow shaft 63 is a sleeve 66 having a cone 67 adapted to be moved into or out of engagement with the inner conical surface 68 of the bearing 64 by means of a lever 69 pivoted at 70 and carrying a pusher member 71 shown most clearly in Fig. 3 and adapted to engage the end of the cone 67 to move it into engagement with the conical surface 68, or to engage a cone 72 which is splined upon the power shift shaft 73 and is adapted to engage the inner conical surface 74 of the stationary member 75 secured by bolts 76 to the bearing 64.

Said power shift shaft 73 at its inner or right hand end 77, viewing Fig. 1, is loosely received within a socket 78 in the left hand end of the shaft 12. Upon the outer or left hand end of said power shift shaft 73 is provided a hand wheel 79 by which when the mechanism is stationary the degree of eccentricity of the gyratory member 20 may be altered or the parts may be moved back to concentric position. The flange 61 and the enlargement 62 provide within the pulley 10 a two part housing wherein the stud shafts and other parts about to be referred to are mounted.

Upon the inner end of the sleeve 66 is formed a series of teeth constituting a pinion 80, shown also in Fig. 4, and adapted to mesh with a gear 81 upon a stud shaft 82 and having, as indicated in dotted lines in Fig. 4, a worm 83 meshing with a worm wheel 84 upon a shaft 85 and having the worm 14 meshing with the worm wheel 13 as shown in Figs. 1 and 4. Suitably supported with the said housing is an idler 86 meshing with the pinion 81 and also with the pinion 86' (see Fig. 1).

The construction and operation of parts are such that when the lever 69 occupies an intermediate position, that is, the upright position represented in Fig. 1, the main drive shaft 11 and the shaft 12 rotate in unison and therefore rotate or turn the eccentric 17 which, if it occupies a concentric position with respect to the main drive shaft 11, does not gyrate the ring or gyratory member 20 and which, if it occupies an eccentric position with respect to the main drive shaft 11, does gyrate said ring or gyratory member 20. The said existing condition is altered by movement of the lever 69 so as to bring either cone 67 or 72 into engagement with the respective conical bearing surface 68 or 74. By moving the cone 67 into engagement with the conical surface 68, the position of the eccentric 17 is altered as by moving it from a zero or non-functioning position to a position of maximum eccentricity or beyond said position of maximum eccentricity back to or towards the zero or non-functioning position. By moving the lever 69 in the opposite direction and engaging the cone 72 with the conical bearing 74, the eccentricity of the eccentric 17 may be reduced from any existing condition to or towards the zero or non-functioning position.

The train of gearing controlled by the lever 69 is self-locking, because of the worm and worm wheels thereof, and said gears remain locked in any position into which they are brought by a movement of the lever 69 and they remain in said locked condition and rotate as a unit but without relative motion, until the lever 69 is again moved and by such movement of the lever 69 the said gears are caused to move with relation to each other so as to impose a different condition of eccentricity upon the eccentric 17 and the gyratory member 20 mounted thereon or to place the same concentric with relation to the main drive shaft, this being determined by the length of time cone 67 or 72 is held in engagement with the respective conical bearing surface 68 or 74 by operation of lever 69.

Having thus described one embodiment of our invention, we desire it to be understood that although specific terms are employed, they are used in a generic and descriptive sense and not for purposes of limitation, the scope of the invention being set forth in the following claims.

Claims:—

1. Speed varying mechanism comprising in combination, a driving element, a driven element and operative connections therebetween, said connections including an eccentric operable by the driving element, a gyrator received thereby, a casing abutment about said gyrator, a series of driving arms movably connected to said gyrator and adapted to engage said casing abutment substantially radially to impart rotative movement to said gyrator, each of said arms having a head formed as an arc struck from a point between the axis of the driving element and the inner surface of the casing abutment and at a radial distance from the latter substantially less than the length of said arms.

2. In a transmission mechanism, a driving element, an ultimately driven element, operative connections therebetween including an eccentric, a gyrator carried thereby, a casing constituting an abutment, a series of driving arms or abutment-engaging members between said gyrator and said casing, movably attached to one of said parts and having driving contact with the other to impart rotative movement to said gyrator, spring means to engage said arms, and means to equalize the pressure of said spring means upon the series of arms.

3. In a transmission mechanism, a driving element, an ultimately driven element, operative connections therebetween including an eccentric, a gyrator carried thereby, a casing constituting an abutment, a series of driving arms or abutment-engaging members between said gyrator and said casing, movably attached to one of said parts and having driving contact with the other to impart rotative movement to said gyrator, and equalized means yieldingly to hold all of said arms against said other part.

4. In a transmission mechanism, a driving element, an ultimately driven element, operative connections therebetween including an eccentric, a gyrator carried thereby, a casing constituting an abutment, a series of driving arms or abutment-engaging members between said gyrator and said casing, movably attached to one of said parts and having driving contact with the other to impart rotative movement to said gyrator, spring means for said arms, and a floating pressure-equalizing ring cooperating with said spring means and said arms.

5. In a transmission mechanism, a driving element, an ultimately driven element, operative connections therebetween including an eccentric, a gyrator carried thereby, a casing constituting an abutment, a series of driving arms or abutment-engaging members between said gyrator and said casing, movably attached to one of said parts and having driving contact with the other to impart rotative movement to said gyrator, a spring for each of said arms, and a floating pressure equalizing ring for the series of arms and against which the spring for each arm works.

6. In a transmission mechanism, a driving element, an ultimately driven element, operative connections therebetween including an eccentric, a gyrator carried thereby, a casing constituting an abutment, a series of driving arms or abutment-engaging members between said gyrator and said casing, movably attached to one of said parts and having driving contact with the other to impart rotative movement to said gyrator, spring means for said arms, and a ring sustained only by the spring pressure of said arms and acting to equalize the pressure thereof.

7. In a transmission mechanism, a driving element, an ultimately driven element, operative connection therebetween including an eccentric, a gyrator carried thereby, a casing constituting an abutment, a series of driving arms or abutment-engaging members pivoted to said gyrator and having driving contact with said casing abutment, spring means for each of said arms, and means to equalize the spring pressure of the series of arms.

8. In a transmission mechanism, a driving element, an ultimately driven element, operative connection therebetween including an eccentric, a gyrator carried thereby, a casing constituting an abutment, a series of driving arms or abutment-engaging members pivoted to said gyrator and having driving contact with said casing abutment, a spring for each arm and a spring pressure equalizer with which the series of springs cooperate.

9. In a transmission mechanism, a driving element, an ultimately driven element, operative connections therebetween including an eccentric, a gyrator carried thereby, a casing constituting an abutment, a series of driving arms or abutment-engaging members pivoted to said gyrator and having driving contact with said casing abutment, a coil spring for each arm and acting normally to hold its arm in contact with the casing abutment, and a floating pressure equalizing ring cooperating with said springs.

10. In a transmission mechanism, a driving element, an ultimately driven element, operative connections therebetween including an eccentric, a gyrator carried thereby, a casing constituting an abutment, a series of driving arms or abutment-engaging members pivoted to said gyrator and having driving contact with said casing abutment a coiled spring carried by each of said arms, and a floating ring supported at the inner ends of said coil springs to equalize the pressure thereof.

11. In a transmission mechanism, a rotatable member having an eccentrically adjustable axis, an annular member, a series of arms movably attached to one of said members and engageable with the other to effect rotation of said rotatable member, and means to equalize the pressure of all said arms on said other member when inactive.

12. In a transmission mechanism, a rotatable member having an eccentrically adjustable axis, an annular member, a series of arms movably attached to one of said members and sequentially engageable with the other to effect rotation of said rotatable member, and means to maintain inactive ones of said arms in yielding contact with said other member under substantially equal pressure.

13. In a variable speed transmission mechanism having a plurality of arm-like driving units pivoted at one end upon a member rotatable about a variable axis and a surrounding member with which said arms may have sequential and substantially radially effective driving contact, means to equalize the pressure of inactive units, and to prevent undue grouping of the same while maintaining them in position to assume sequentially a driving relation.

14. In a transmission mechanism including a circumferential series of driving units and an annular member with which said units are adapted operatively to engage at their outer ends in sequence, a rotary support for the inner ends of all said units, and unitary means intermediate said support and said annular member to maintain inactive units in non-interfering inter-relation and in readiness each to become sequentially operative.

15. In transmission mechanism, in combination with an interior member and an annular member surrounding the axis thereof, at least one of said members being rotatable, a circumferential series of arms pivoted to one of said members and engageable each periodically with the other at any point circumferentially of the latter to effect rotation of one of them, and arm-distributing and pressure-equalizing means for said arms.

16. In transmission mechanism for converting given rotary into variable speed rotary motion, in combination, an operatively associated train of elements including a rotary member, an annular member surrounding the axis thereof, and a group of driving elements distributed about the axis of said annular member and each operatively engaged at one end with said rotary member, means to produce variable, relative change of position between said annular member and said driving elements to cause the opposite end portion of each of the latter periodically drivingly to engage said annular member, at any point circumferentially of the latter thereby to effect rotation of one of said members engaged, and distributing and pressure-equalizing means for said driving elements.

17. In a transmission mechanism having two relatively rotatable members and a substantially radial series of arms pivotally carried by one of said members for driving one from the other, means for maintaining the desired relative distribution and equalizing the pressure of said arms.

18. In a transmission mechanism, a driving element, a driven element, and operative connections between them including an eccentric connected to the driving element, a gyrator carried thereby connected to the driven element, a casing constituting an abutment, a series of driving arms or abutment-engaging members between said gyrator and said casing, movably attached to one of said parts and having sequential driving contact with the other to impart rotative movement to said gyrator, and guide means to hold all temporarily non-driving arms constantly in position to assume in said sequence driving contact with one of said parts.

19. In a transmission mechanism, a driving element, a driven element, and operative connections between them including an eccentric connected to the driving element, a gyrator carried thereby connected to the driven element, a casing constituting an abutment, a series of driving arms or abutment-engaging members pivoted to said gyrator and having an arcuate surface upon their outer extremities for contact with said casing abutment, guiding means, and means upon each of said arms substantially at the center from which said arcuate surface is struck and cooperating with said guiding means to maintain the arms in functioning relation.

20. In a transmission mechanism, a driving element, a driven element, and operative connections between them including an eccentric connected to the driving element, a gyrator carried thereby connected to the driven element, a casing constituting an abutment, a series of driving arms or abutment-engaging members pivoted to said gyrator and each having an arcuate head for driving contact with said casing abutment, annular guiding means, and means upon each of said arms having a point of contact with said guiding means at or near the center from which said arcuate head is struck whereby said arms are maintained in functioning relation and are permitted a rolling as well as a slipping and driving contact with said casing.

In testimony whereof, we have signed our names to this specification.

BICKNELL HALL.
EDGAR F. HATHAWAY.